(12) United States Patent
Nelson et al.

(10) Patent No.: US 8,925,999 B2
(45) Date of Patent: Jan. 6, 2015

(54) FAIRING MOUNTING SYSTEM

(71) Applicant: PACCAR Inc., Bellevue, WA (US)

(72) Inventors: Christopher A. Nelson, Sanger, TX (US); Stephen L. Pilcher, Houston, TX (US); Kunjithapadam Raghavendran, Denton, TX (US); Paul J. Troxler, Bellingham, WA (US); David J. Berger, Flower Mound, TX (US); Muhammad Salman, Argyle, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 13/840,209

(22) Filed: Mar. 15, 2013

(65) Prior Publication Data

US 2014/0265434 A1  Sep. 18, 2014

(51) Int. Cl.
*B60J 9/00* (2006.01)
*B62D 35/00* (2006.01)

(52) U.S. Cl.
CPC .................. *B62D 35/001* (2013.01)
USPC .................................................. 296/180.3

(58) Field of Classification Search
USPC ................. 296/180.1, 180.2–180.4
IPC .......................................... B60J 9/00
See application file for complete search history.

(56) References Cited

U.S. PATENT DOCUMENTS

| | | | |
|---|---|---|---|
| 4,458,936 A | 7/1984 | Mulholland | |
| 4,915,441 A | 4/1990 | Nitzke | |
| 5,536,062 A | 7/1996 | Spears | |
| 5,788,321 A | 8/1998 | McHorse | |
| 5,947,520 A | 9/1999 | McHorse | |
| 6,126,229 A | 10/2000 | Lund | |
| 6,644,700 B2 * | 11/2003 | Ito et al. | 293/117 |
| 6,905,164 B2 | 6/2005 | Marrs | |
| 6,964,441 B2 * | 11/2005 | Ariga et al. | 293/117 |
| 7,232,179 B1 | 6/2007 | Racz | |
| 8,056,959 B2 | 11/2011 | Plett | |
| 2007/0018482 A1 | 1/2007 | Tuohimaa | |
| 2008/0231079 A1 | 9/2008 | Grady | |
| 2011/0042998 A1 * | 2/2011 | Rinehart et al. | 296/180.3 |
| 2011/0121612 A1 | 5/2011 | Plett | |
| 2012/0234975 A1 | 9/2012 | Timm | |

FOREIGN PATENT DOCUMENTS

| | | |
|---|---|---|
| EP | 0 888 946 A1 | 1/1999 |
| EP | 1 222 105 B1 | 12/2008 |
| GB | 686767 A | 1/1953 |

* cited by examiner

*Primary Examiner* — Pinel Romain
(74) *Attorney, Agent, or Firm* — Christensen O'Connor Johnson Kindness PLLC (57) ABSTRACT

A mounting system is provided that mounts a fairing to the cab of a semi-tractor in a manner that hides the fasteners from view. The mounting system provides quicker assembly and disassembly among others. The mounting system may include anchor pins at one end section of the transition fairing, a single mounting screw at the opposite end section of the transition fairing, and one or more fasteners of the Snaploc® type at the mid-section of the transition fairing. Each of the couplings interface with a suitable corresponding bracket, etc, in order to mount the fairing to the associated surface of the vehicle.

8 Claims, 10 Drawing Sheets

FAIRING MOUNTING SYSTEM

BACKGROUND

Contemporary styling and good aerodynamic practice in truck design make use of chassis skirts and fairings which cover the lower portions of the truck's chassis and interfaces between vehicle sections, such as the roof to trailer transition, the cab body to sleeper body transition, etc. In addition to providing an aerodynamic surface, the fairings must be securely mounted to withstand harsh road conditions, such as high winds, vibrations, shocks and flying debris.

Prior art skirts, fairings, and panels typically fasten to the vehicle frame. There are commonly known systems that fasten the skirts, fairings, and panels to the vehicle. Many of these systems, however, require a large number of attachment points, in some case 6 to 10, using only bolts or screws. This makes the installation/ removal/ of the skirt, fairing or panel a time consuming and labor intensive process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a vehicle fairing mounting system is provided. The system includes a fairing having a lower section, a mid-section, and a top section, the fairing having an aesthetically pleasing outer panel and inner panel. The system also includes a first, tool-less fairing connection interface disposed about the lower section of the fairing. In some embodiments, the first fairing connection interface is configured to restrain movement along an axis normal to the longitudinal axis of the fairing and restraining movement along the longitudinal axis at a position below the connection. The system also includes a second, tool-less fairing connection interface disposed about the mid-section of the fairing. The second fairing connection interface in some embodiments is configured to act as a snap fit coupling to restrain movement about an axis normal and perpendicular to the longitudinal axis of the fairing. The system further includes a third fairing connection interface disposed about the upper section, wherein the third fairing connection interface includes a single fastener.

In accordance with another aspect of the present disclosure, a vehicle fairing mounting system is provided. The system includes a fairing having a lower section, and mid-section, and a top section. The fairing has an aesthetically pleasing outer panel and inner panel. The system also includes a first connection interface assembly disposed about the lower section of the fairing. In some embodiments, the first connection interface assembly includes at least one mounting pin assembly mounted to the inner panel, wherein the mounting pin assembly has at least one pin extending downwardly a paced distance from the inner panel and positioned in a substantially vertical orientation. The first connection interface assembly further includes a mounting bracket adapted to be mounted to a vehicle. The mounting bracket includes a cooperating aperture for each mounting pin for sportingly receiving the mounting pin therein. The system also includes a second connection interface assembly disposed about the mid-section of the fairing. The second fairing connection interface in some embodiments is configured to act as a snap fit coupling. The second connection interface assembly may comprise a first component mounted to the inner panel and a cooperating second component associated with a mounting bracket. The system further includes a third connection interface assembly disposed about the upper section, wherein the third fairing connection interface includes a support member adapted to be mount to a vehicle and a fastener that passes through the fairing and fastens to the support member.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

Generally described, the examples of the present disclosure are directed to mounting systems that mounts a fairing to the cab of a semi-tractor in a manner that hides the fasteners from view. In some embodiments, the transition fairing provides an aerodynamic and stylish interface between the cab and the sleeper. While a vertically oriented fairing is described in the examples herein, it will be appreciated that aspects of the present disclosure have wide application, and thus, may be employed with mounting fairings or the like at any orientation, such as horizontal, slanted, etc. Furthermore, the mounting system may be employed to mount any panel, etc., to an object.

As will be described in more detail below, examples of the mounting system provide quicker assembly and disassembly among others. Some examples of the mounting system described herein include anchor pins at the bottom section of the vertical transition fairing, a single mounting screw at the top section of the vertical transition fairing, and one or more fasteners of the Snaploc® type at the mid-section of the vertical transition fairing. Each of the fasteners described above interface with a suitable corresponding bracket, etc, in order to mount the fairing to the associated surface of the vehicle.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
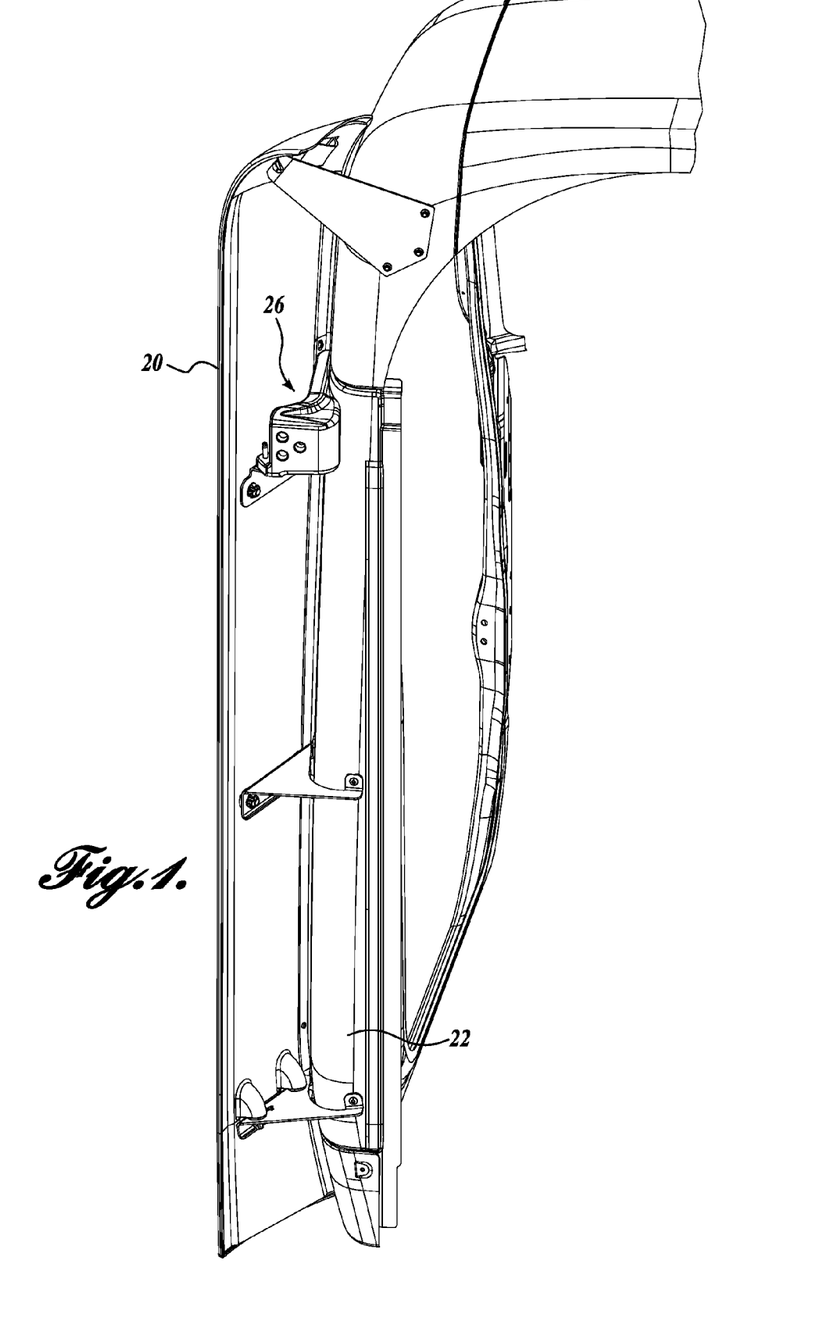
FIG. 1 is rear perspective view of a vehicle fairing, such as a transition fairing, coupled to the cab of a heavy truck via one example of a fairing mounting system.
Figure 2:
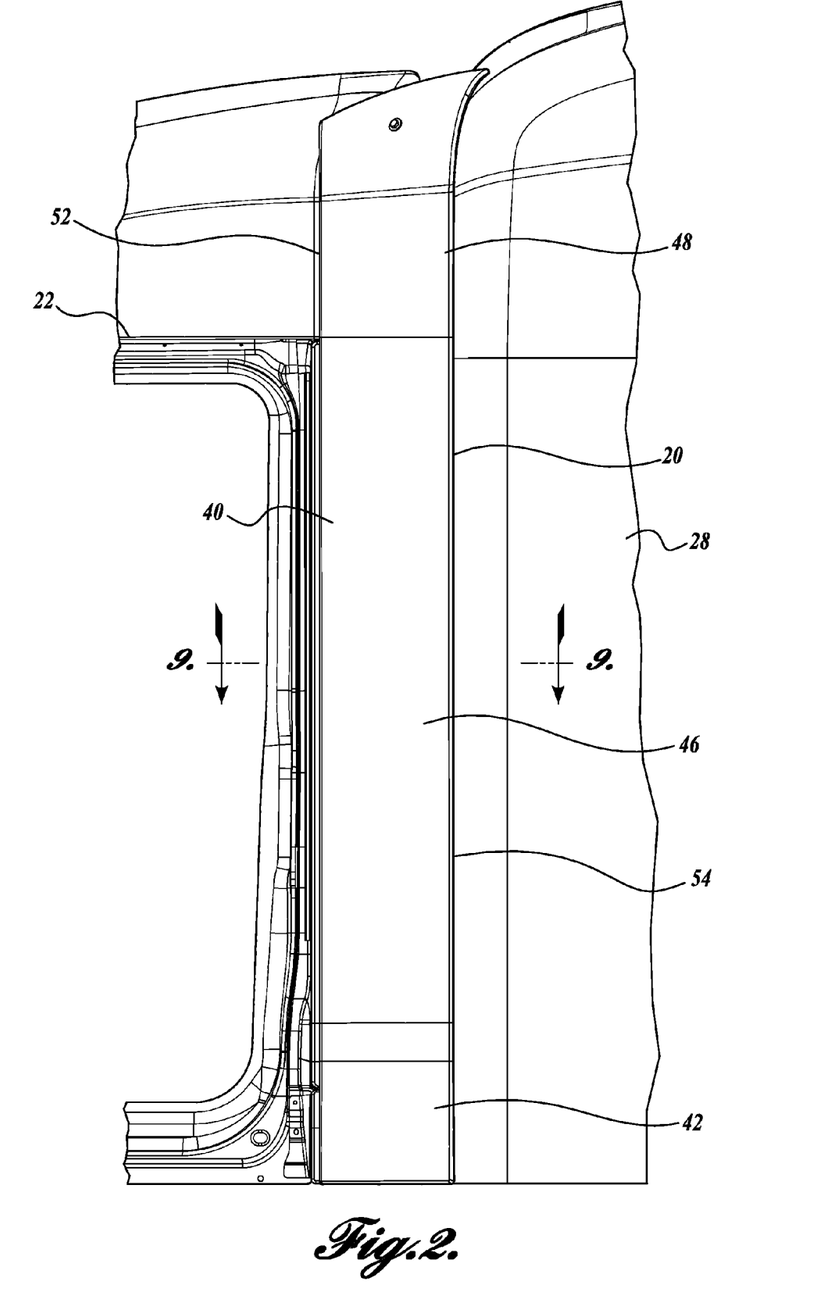
FIG. 2 is a partial side view of a vehicle in which a fairing is mounted by the fairing mounting system of FIG. 1.

Referring now to FIG. 1, there is shown a vehicle fairing 20, such as a transition fairing, coupled to the cab 22 of a heavy truck via a fairing mounting system 26. In some embodiments, the fairing 20 is mounted to the B-pillar cover or skin of the cab 22. When mounted in this example, the fairing 20 provides an aerodynamic and stylish interface between the cab 22 and the sleeper section 28 with minimal visibility of fasteners, etc, as best shown in FIG. 2.

Figure 3:
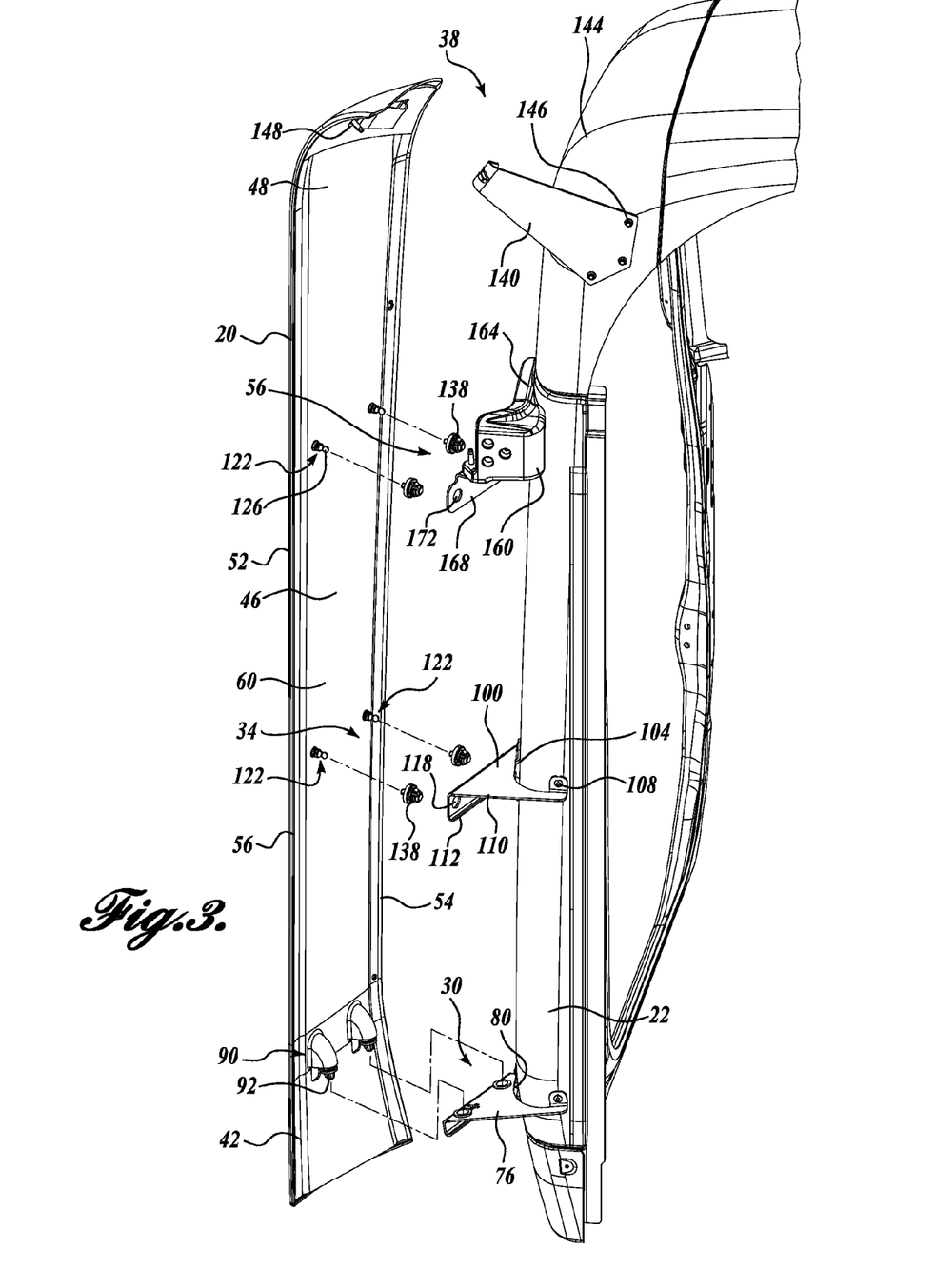
FIG. 3 is a rear exploded view of the fairing mounting system of FIG. 1.
Figure 4:
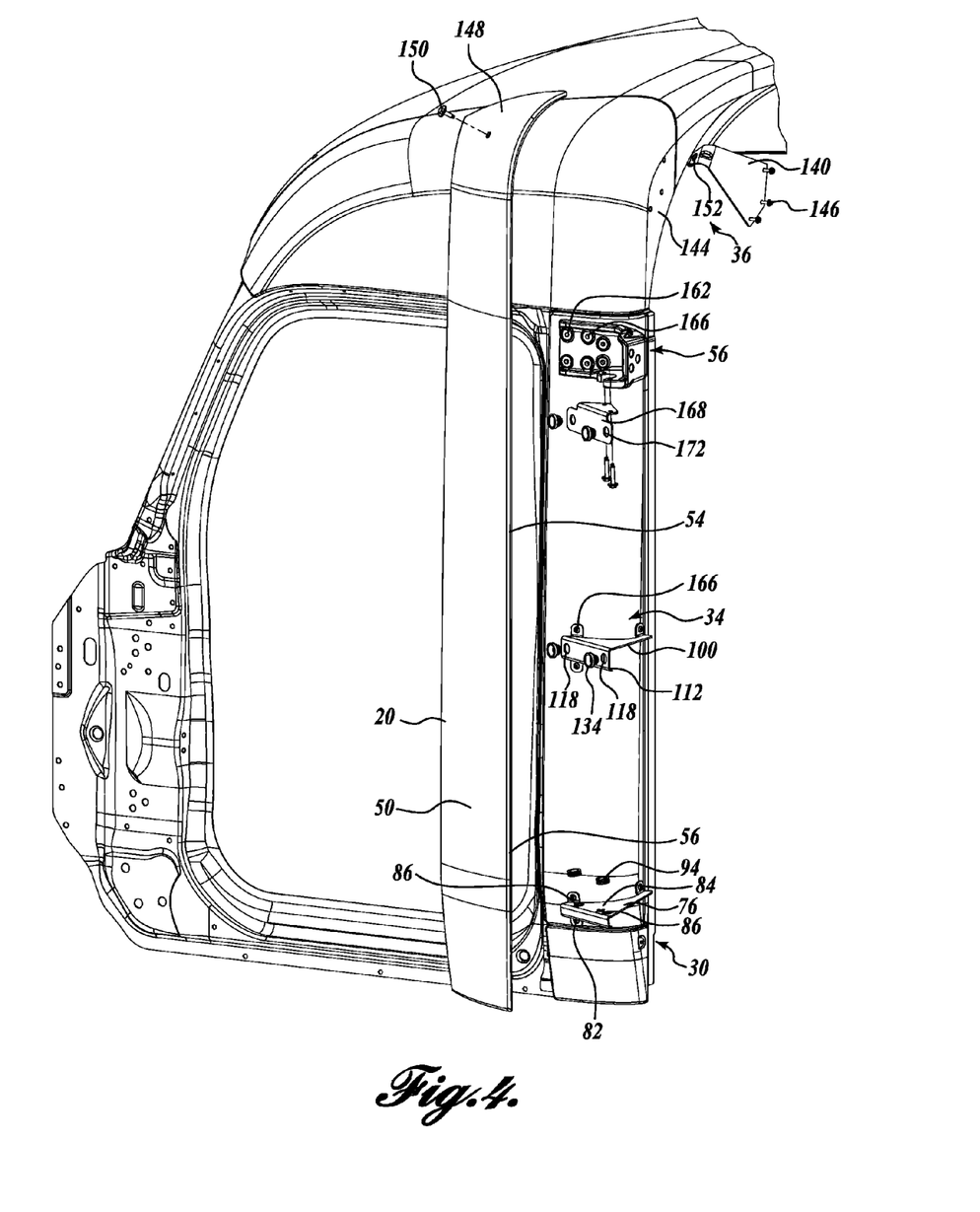
FIG. 4 is a side exploded view of the fairing mounting system of FIG. 1.

FIGS. 3 and 4 are rear and side exploded views of one example of the fairing mounting system 26 formed in accordance with aspects of the present disclosure. As best shown in FIGS. 3 and 4, the fairing mounting system 26 includes a plurality of interface assemblies 30, 34, and 38, which are configured to mount the fairing 20 to a surface of an associate vehicle, such as the cab 22 of a heavy truck. In the embodiment shown in FIGS. 1-4 and 9, the fairing 20 includes a body 40 having a generally vertical layout or orientation composed of a lower section 42, a mid-section 46, and an upper section 48. The body includes a front panel 50 having a smooth, aerodynamic surface that extends from a leading edge 52 positioned proximal the cab surface to a trailing edge 54 positioned proximal to a sleeper section surface. Opposite the front panel 50 is rear panel 60. Attached at the lower, mid, and upper sections 42, 46, 48 are the first, second and third interface assemblies 30, 34, and 38, respectively. A fourth interface assembly 56 may be optionally included and disposed in-between the second assembly and the third assembly.

As best shown in FIGS. 3 and 4, the first interface assembly 30 includes a coupling assembly composed of a support bracket 76 configured to be mounted to a vehicle surface, such as the vehicle cab 22, via appropriate fasteners, such as screws, rivets, etc. Alternatively, the support bracket 76 can be adhesively bonded, heat bonded or welded to the vehicle surface. In the embodiment shown, the support bracket 76 includes a surface interface 80 that cooperates with the vehicle surface. The support bracket 76 also includes apertures 82 for receiving appropriate fasteners, such as screws, rivets, bolts, or the like, to mount the support bracket 76 to the vehicle surface. The support bracket 76 further includes a plate-like extension 84 that extends outwardly in a plane generally perpendicular to the vertical axis of the vehicle. A plurality of spaced-apart apertures 86 are provided in the plate-like extension 84 at a position near the side periphery thereof. As such, the apertures 86 define substantially vertically aligned central axes. The apertures 86 can be reinforced, if desired, and are configured to receive mounting pins therein.

The coupling assembly of the first interface assembly 30 also includes mounting pin assemblies 90, which are fixedly mounted to the rear panel 60 at the lower section 42 of the fairing 20. The mounting pin assemblies 90 include mounting pins 92 spaced from the rear panel 60 and extend in a downwardly direction, defining a general vertical orientation. The mounting pins 92 are configured such that their free ends can be inserted into the apertures 86 in order for the support bracket 76 to support the lower section 42 of the fairing 20, as best shown in FIG. 1. As such, the first interface assembly 30 allows for a tool-less mounting interface between the fairing 20 and the support bracket 76.

In some embodiments, the interface between the pins 92 and the apertures 86 can be slightly oversized to allow easy vertical sliding, an interference fit to provide firm retention therein, etc. Additionally or alternatively, elastomeric grommets 94 may be inserted in the apertures 86 to allow the fairing 20 some movement with respect to the vehicle. As a result, the first interface assembly 30 restrains movement of the fairing 20 in a direction normal to the longitudinal axis of the fairing while providing unconstrained rotation in some embodiments about a substantially vertical axis. The first interface assembly 30 also restrains downwardly linear movement of the fairing 20 with respect to the vehicle surface.

The second interface assembly 34 includes a coupling assembly composed of a support bracket 100 configured to be mounted to a surface of the vehicle via appropriate fasteners, such as screws, rivets, etc. Alternatively, the support bracket 100 can be adhesively bonded, heat bonded or welded to the vehicle surface. In the embodiment shown, the support bracket 100 includes a surface interface 104 that is configured to cooperate with the vehicle surface. In the embodiment shown, the support bracket 100 also includes apertures 108 for receiving screws, bolts, rivets, or other appropriate fasteners, in order to mount the support bracket 100 to the vehicle surface. The support bracket 100 also includes an extension section 110 that extends outwardly in a plane generally perpendicular to the vertical axis of the vehicle and a flange section 112 that extends downwardly in a generally vertical orientation from a side edge of the extension section 110. In the embodiment shown, the flange section is oriented at an angle to the longitudinal axis of the vehicle when mounted thereon. A plurality of connecting components, such as bores 118, spherical recesses, or the like, are associated with the flange section 112 for interfacing with corresponding male "snap" fasteners. As such, the connecting components, such as bores 118, define substantially horizontally aligned central axes.

Figure 10:
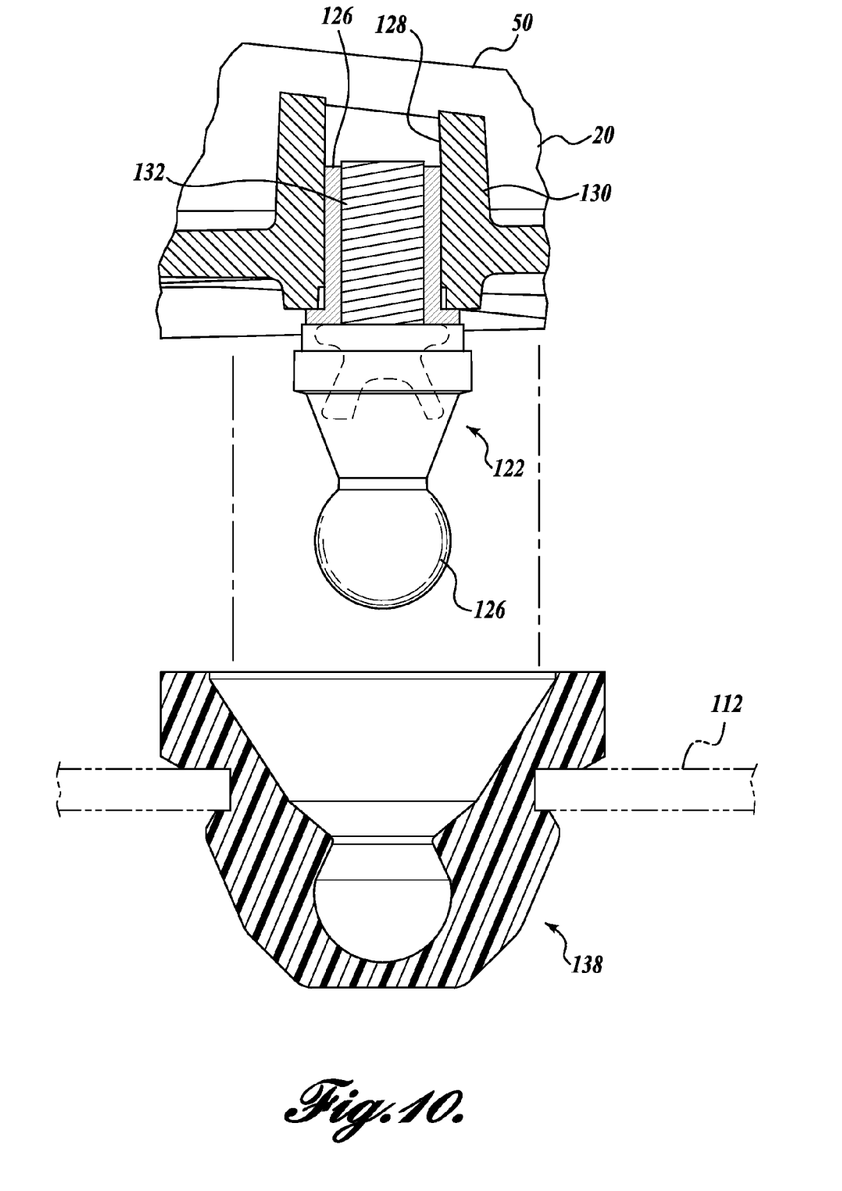
FIG. 10 is a cross-section view of components of one of the interface assemblies that from a "snap" fit connection.

The coupling assembly of the second interface assembly 34 also includes a plurality of post assemblies 122, which are fixedly mounted to the rear panel 60 at about the mid-section 46 of the fairing 20. As best shown in FIG. 10, the post assemblies 122 include a mounting insert 126 that is embedded or otherwise affixed within a cylindrical bore 128 of a boss 130 provided in the rear panel 60 of the fairing 20. The post assemblies 122 also include a ball portion 126 anchored to a stud 132 having external threads. The external threads cooperate with internal threads provided in the mounting insert 126 to secure the ball portion 126 to the fairing 20.

In some embodiments, the ball portion 126 of each post assembly 122 is configured to be received in a "snap-like" manner within the connector components, such as bores 118, of the support bracket 100. In other embodiments, cooperating grommets or caps 138 are employed to "snap" onto the ball portion 126 once inserted through the bores 118 (See FIG. 10). In either case, the second interface assembly 34 allows for a tool-less mounting interface between the fairing 20 and the support bracket 100. As a result, the second interface assembly 34 restrains movement of the fairing in a direction normal to and parallel with the longitudinal axis of the fairing.

The third interface assembly 38 includes a coupling assembly in the form, for example, an elongated support 140 configured to be mounted to a surface 144, such as a cab rear or side surface or a roof fairing, of the vehicle at a first end via appropriate fasteners, such as bolts 146. At the opposite end, the support 140 is configured to be attached to the fairing 20 at the upper section 48. In that regard, the fairing 20 includes a small hole 148 through the front and rear panels for receiving a suitable fastener 150 therethrough. When assembled, the fastener 150 extends through the hole 148 of the fairing 20 and is secured to the support 140 in any suitable manner. For example, the end of the support 140 may include a threaded boss 152 or hole for cooperating with the fastener 150, such as a screw or bolt. In other embodiments, the end of the support 140 may include a non-threaded hole or suitable structure to interface with a rivet or the like. To provide a pleasing and aerodynamic appearance, the hole 148 exiting the front panel 50 may be countersunk, if desired.

Still referring to FIGS. 3 and 4, the optional fourth interface assembly 56 includes a coupling assembly composed of a support block 160 configured to be mounted to a surface of the vehicle via appropriate fasteners 162, such as screws, rivets, etc. Alternatively, the support block 160 can be adhesively bonded, heat bonded or welded to the vehicle surface. In the embodiment shown, the support block 160 includes a surface interface 164 that is configured to cooperating with the vehicle surface, and a plurality of apertures 166 for receiving screws, bolts, rivets, or other appropriate fasteners 162 in order to mount the support block 160 to the vehicle surface. The support block 160 also includes a mounting flange 168 that is mounted to or integrally formed with the support block 160. The mounting flange 168 extends downwardly in a generally vertical orientation, and in the embodiment shown, at an angle to the longitudinal axis of the vehicle. A plurality of connector components, such as bores 172, spherical recesses, or the like, are associated with the flange section 112. As such, the connector components, such as bores 172, define substantially horizontally aligned central axes.

The connector components, such as bores 172, are configured for interfacing with corresponding male "snap" fasteners, such as mounting post assemblies 122 described above, for coupling the fairing 20 to the vehicle surface. In that regard, a plurality of post assemblies 122 are fixedly mounted to the rear panel 60 at about the mid-section 46 of the fairing 20. In use, the ball portion 126 of each post assembly 122 is configured to be received in a "snap-like" manner within the connector components, such as bores 172, of the mounting flange 168. As such, the fourth interface assembly 56 allows for another tool-less mounting interface between the fairing 20 and the support block 160. As a result, the fourth interface assembly restrains movement of the fairing in a direction normal to and parallel with the longitudinal axis of the fairing 20.

Figure 5:
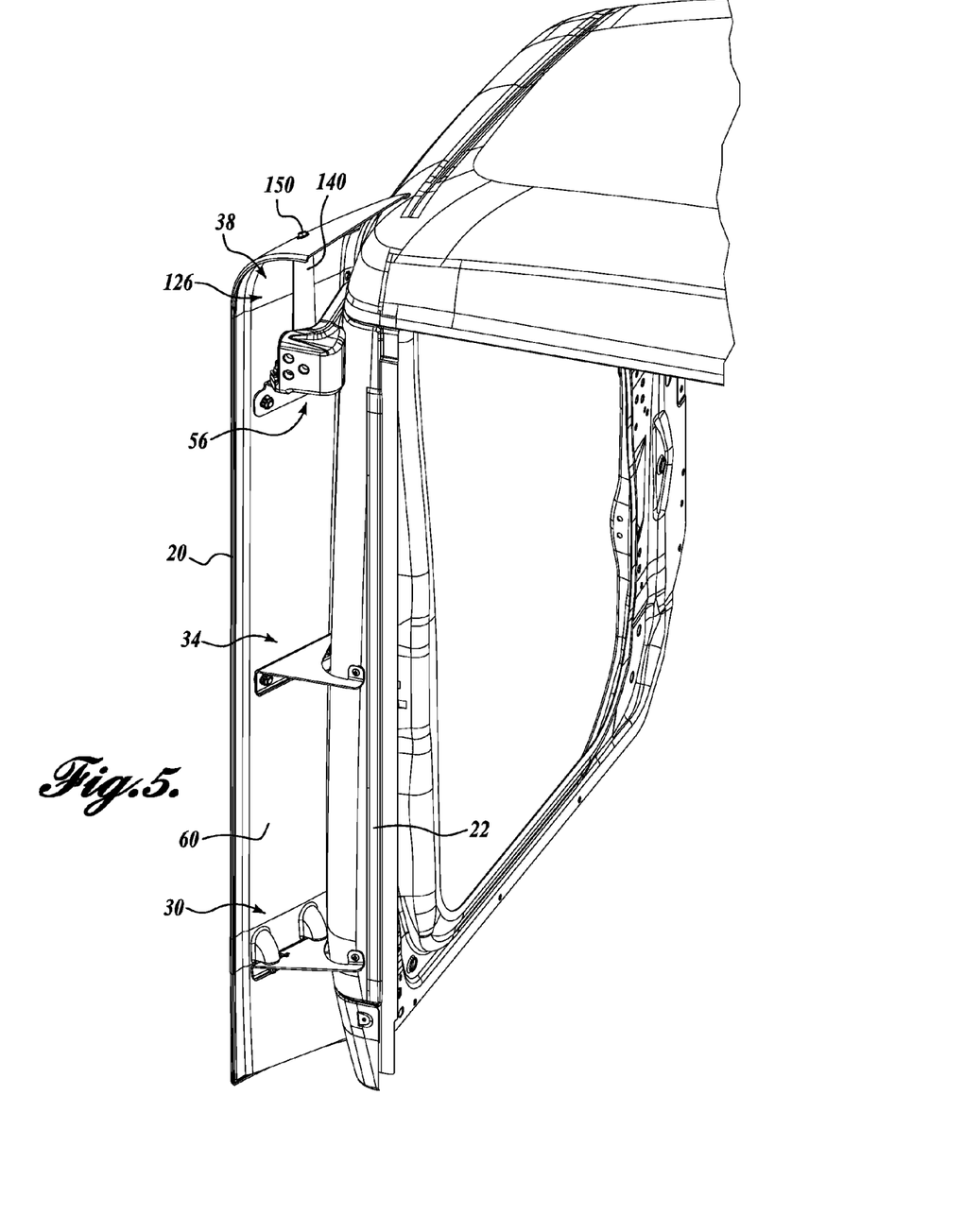
FIG. 5 is a rear perspective view of a vehicle fairing, such as a transition fairing, coupled to the cab of a heavy truck via another example of a fairing mounting system.
Figure 6:
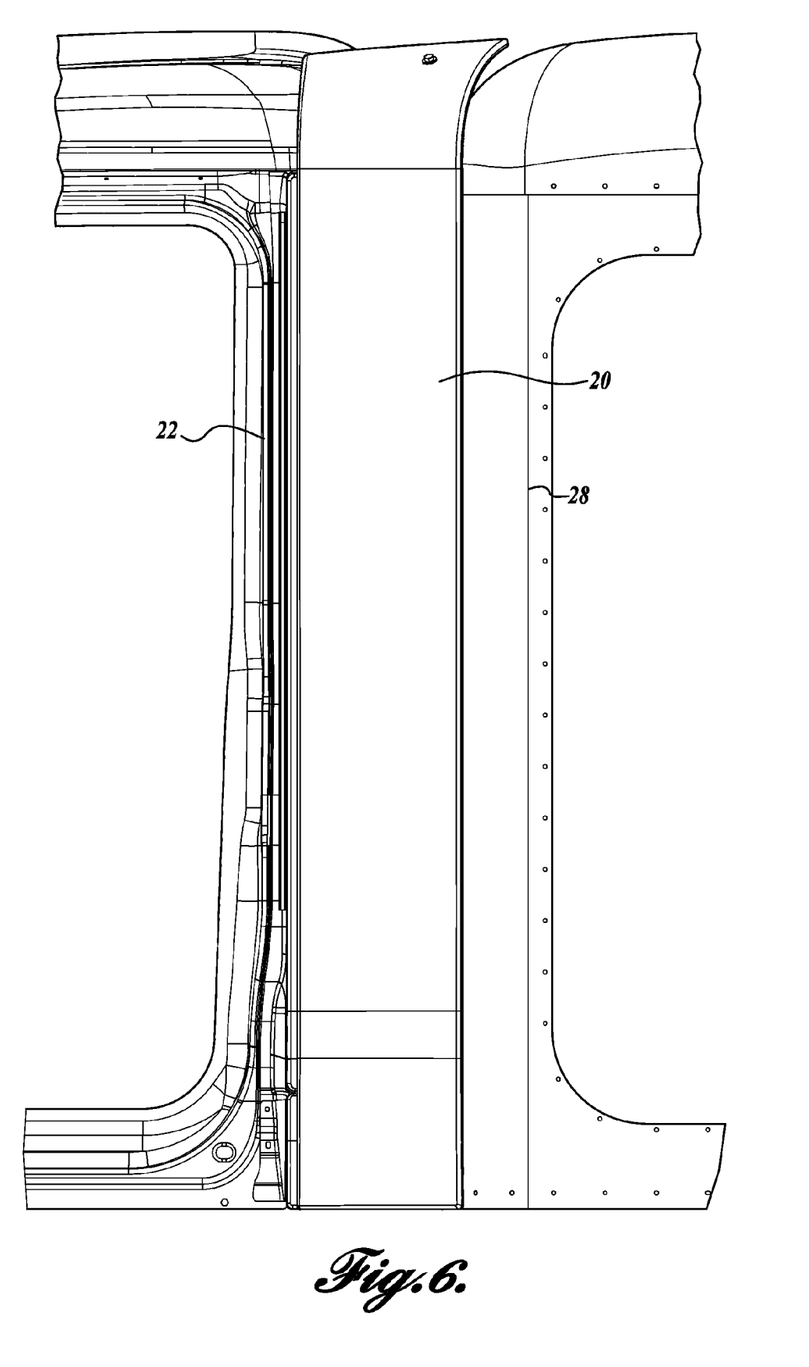
FIG. 6 is a partial side view of a vehicle in which a fairing is mounted by the fairing mounting system of FIG. 5.
Figure 7:
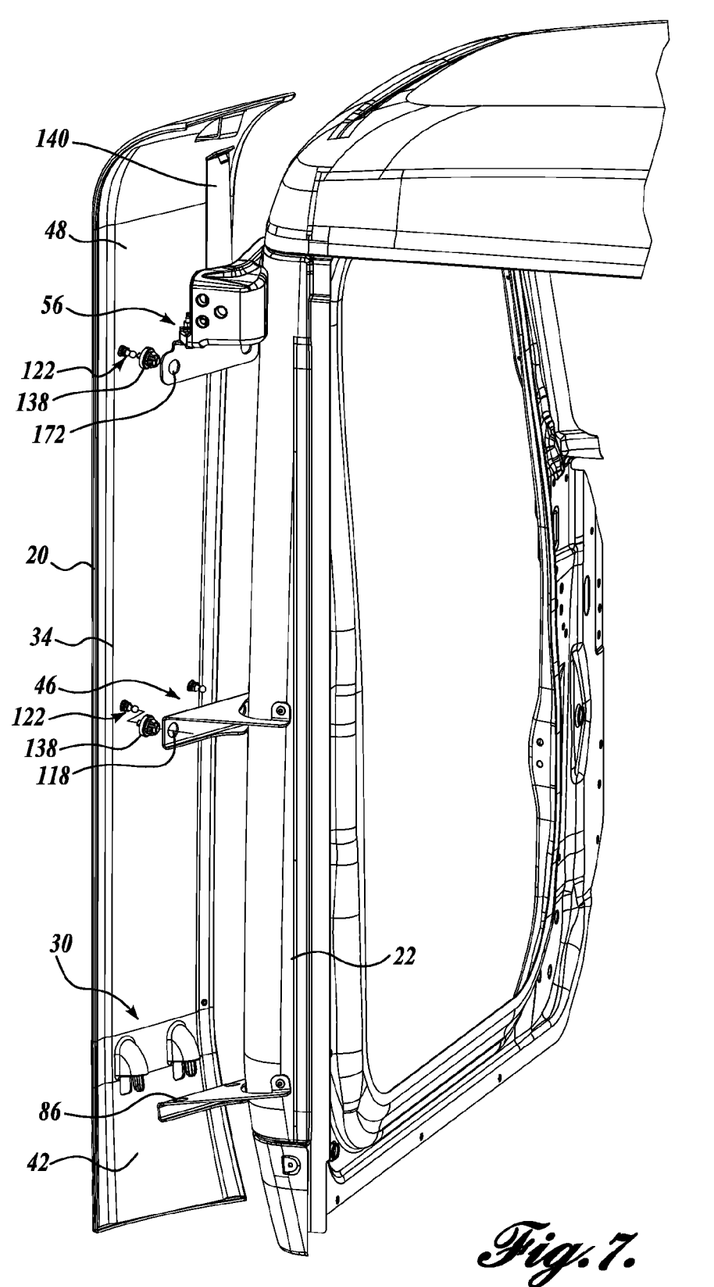
FIG. 7 is a rear exploded view of the fairing mounting system of FIG. 5.
Figure 8:
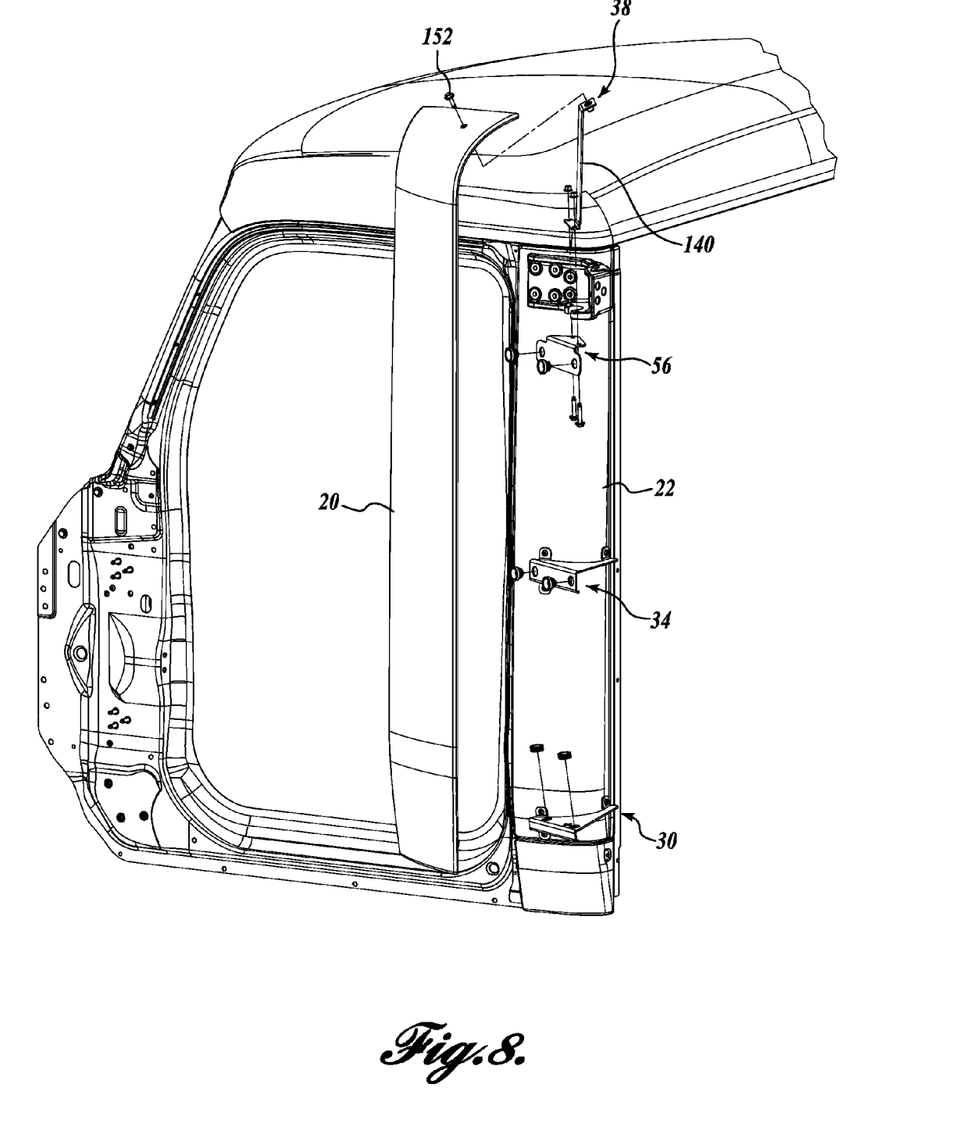
FIG. 8 is a front exploded view of the fairing mounting system of FIG. 5.
Figure 9:
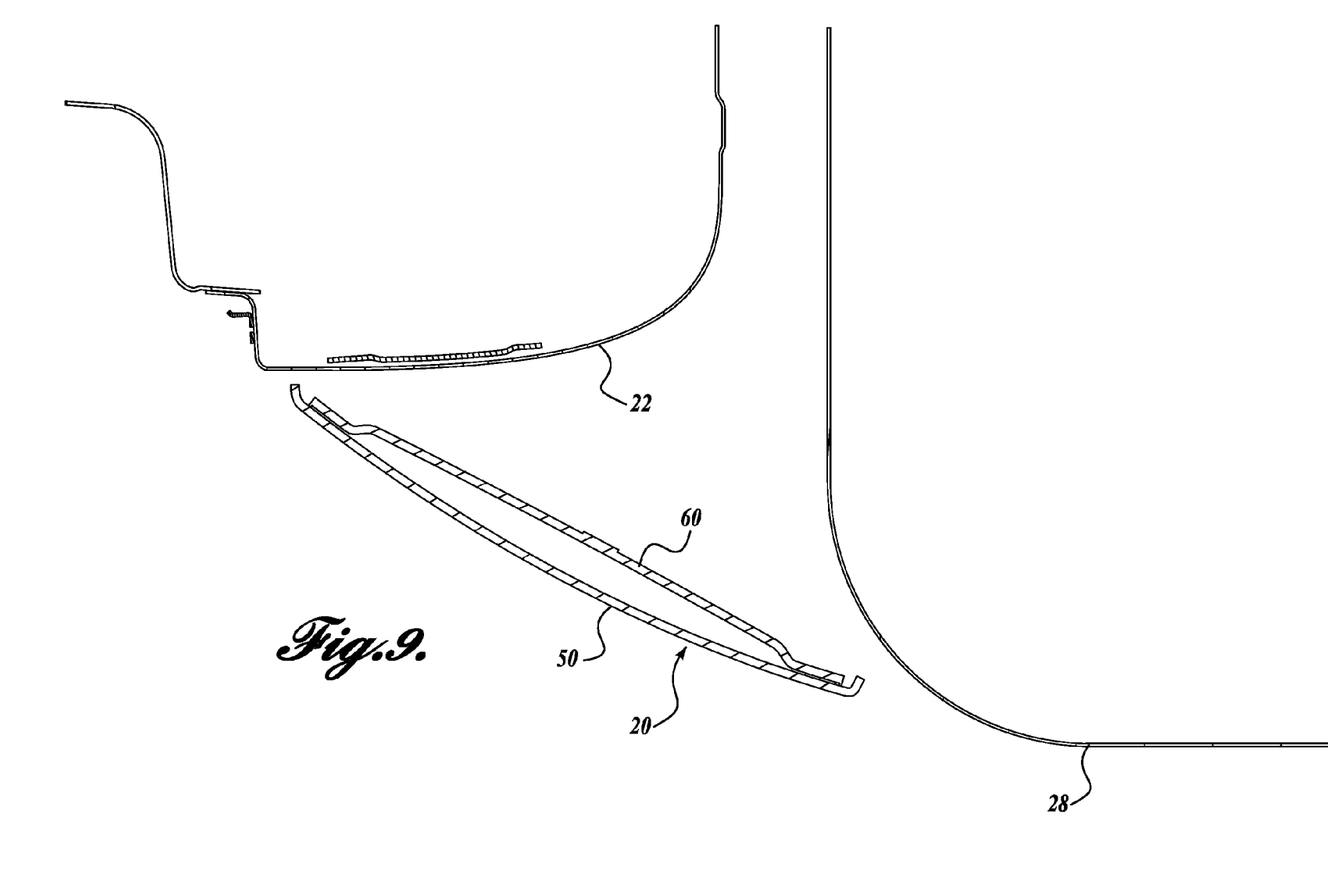
FIG. 9 is a cross section of the fairing of FIG. 1.

FIGS. 5-8 illustrates another example of a mounting system 126 formed in accordance with aspects of the present disclosure. The mounting system 126 is substantially identical in construction and operation as the mounting system 26 except for the differences that will now be described. As best shown in FIGS. 5, 6, and 7, the elongated support 140 in the third interface assembly 38 is not mounted to the vehicle surface but instead extends somewhat vertically downwardly and is secured to the support block 160. In the embodiment shown, the end of the support 140 can be suitably fastened to the support block 160 in any suitable manner.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A vehicle fairing mounting system, comprising:
   a fairing having a lower section, a mid-section, and a top section, the fairing having an aesthetically pleasing outer panel and inner panel;
   a first, tool-less fairing connection interface disposed about the lower section of the fairing, the first fairing connection interface configured to restrain movement along an axis normal to a longitudinal axis of the fairing, the first fairing connection interface configured to restrain movement in a first direction along the longitudinal axis and to allow movement in a second direction along the longitudinal axis;
   a second, tool-less fairing connection interface disposed about the mid-section of the fairing, the second fairing connection interface configured to act as a snap fit coupling to restrain movement about an axis perpendicular to the longitudinal axis of the fairing; and
   a third fairing connection interface disposed about the top section, wherein the third fairing connection interface includes a single fastener.

2. The vehicle fairing mounting system of claim 1, further comprising a fourth, tool-less fairing connection interface disposed about the mid-section of the fairing, the fourth fairing connection interface configured to act as a snap fit coupling to restrain movement along the axis perpendicular to the longitudinal axis of the fairing.

3. The vehicle fairing mounting system of claim 2, wherein the third fairing connection interface includes a support, wherein a first end of the support is configured to receive the single fastener and a second end is configured to mount to the associated vehicle.

4. The vehicle fairing mounting system of claim 2, wherein the third fairing connection interface includes a support, wherein a first end of the support is configured to receive the single fastener and a second end extends downwardly and mounts to a support member of the fourth, tool-less fairing connection interface.

5. The vehicle fairing mounting system of claim 1, wherein the fairing includes an aperture disposed through the outer and inner panel, the aperture configured to receive the single fastener.

6. A vehicle fairing mounting system, comprising:
a fairing having a lower section, and mid-section, and a top section, the fairing having an aesthetically pleasing outer panel and inner panel;
a first connection interface assembly disposed about the lower section of the fairing, the first connection interface assembly including at least one mounting pin assembly mounted to the inner panel, the mounting pin assembly having at least one pin extending downwardly a paced distance from the inner panel and positioned in a substantially vertical orientation, wherein the first connection interface assembly further includes a mounting bracket adapted to be mounted to a vehicle, the mounting bracket including a cooperating aperture for each mounting pin for supportingly receiving the mounting pin therein;
a second connection interface assembly disposed about the mid-section of the fairing, the second fairing connection interface configured to act as a snap fit coupling, the second connection interface assembly comprising a first component mounted to the inner panel and a cooperating second component associated with a mounting bracket; and
a third connection interface assembly disposed about the upper section, wherein the third fairing connection interface includes a support member adapted to be mount to a vehicle and a fastener that passes through the fairing and fastens to the support member.

7. The vehicle fairing mounting system of claim 6, wherein the second connection interface assembly includes one or more posts that extend outwardly from the inner panel of the fairing, and a support member configured to be mounted to the vehicle, the support member including a cooperatingly configured mount for each of the one or more posts.

8. The vehicle fairing mounting system of claim 6, further comprising a fourth fairing connection interface disposed about the mid-section of the fairing, the fourth fairing connection interface configured to act as a snap fit coupling.

* * * * *